Jan. 14, 1964 D. S. TOFFOLO 3,118,104
HIGH CURRENT SIGNAL TRANSLATING CIRCUIT FOR
USE WITH THREE PHASE CONVERTER
Filed Sept. 30, 1959 5 Sheets-Sheet 1
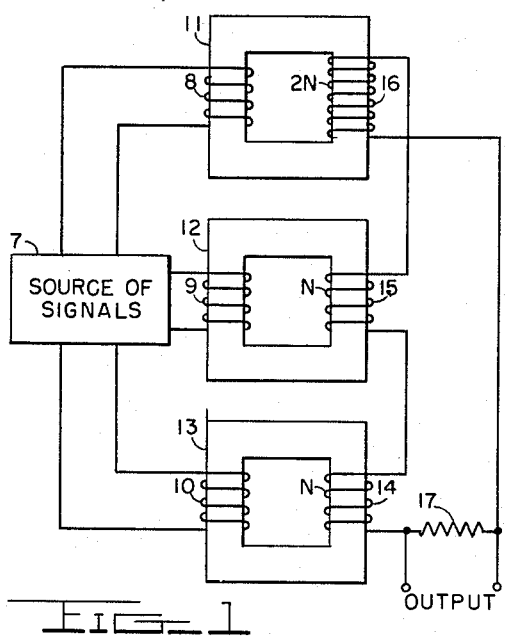
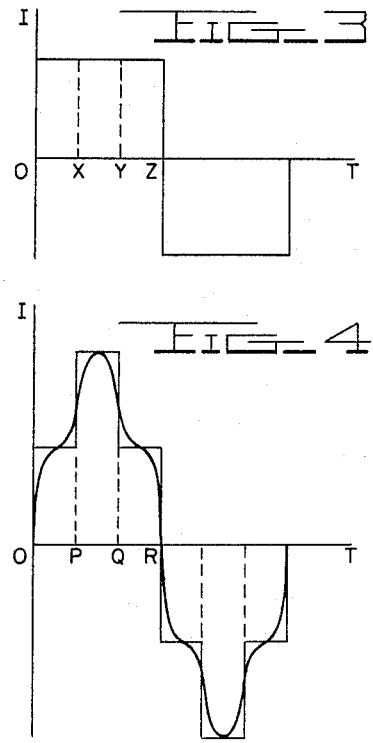
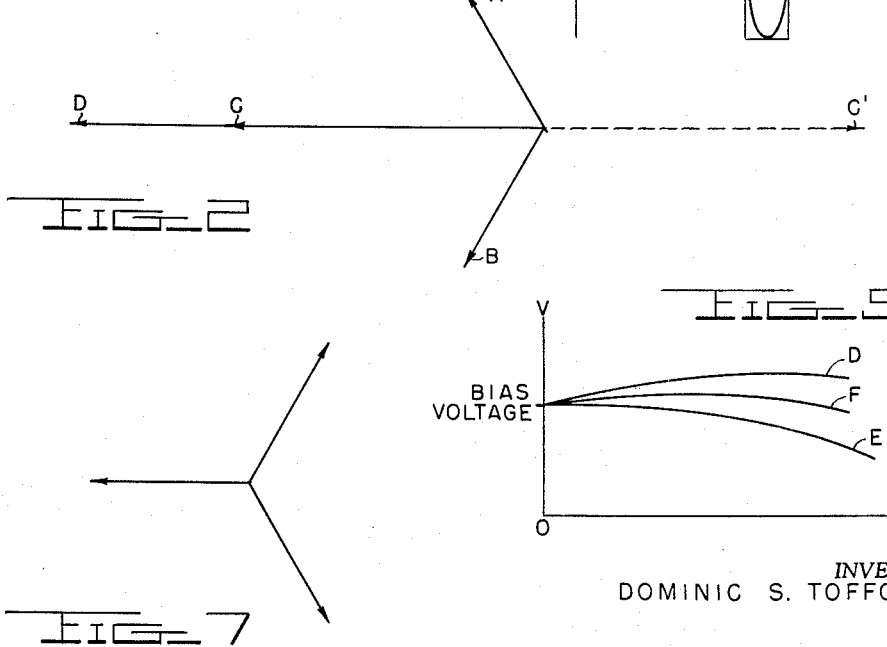
INVENTOR
DOMINIC S. TOFFOLO
BY *Richard C. Reel*
ATTORNEY

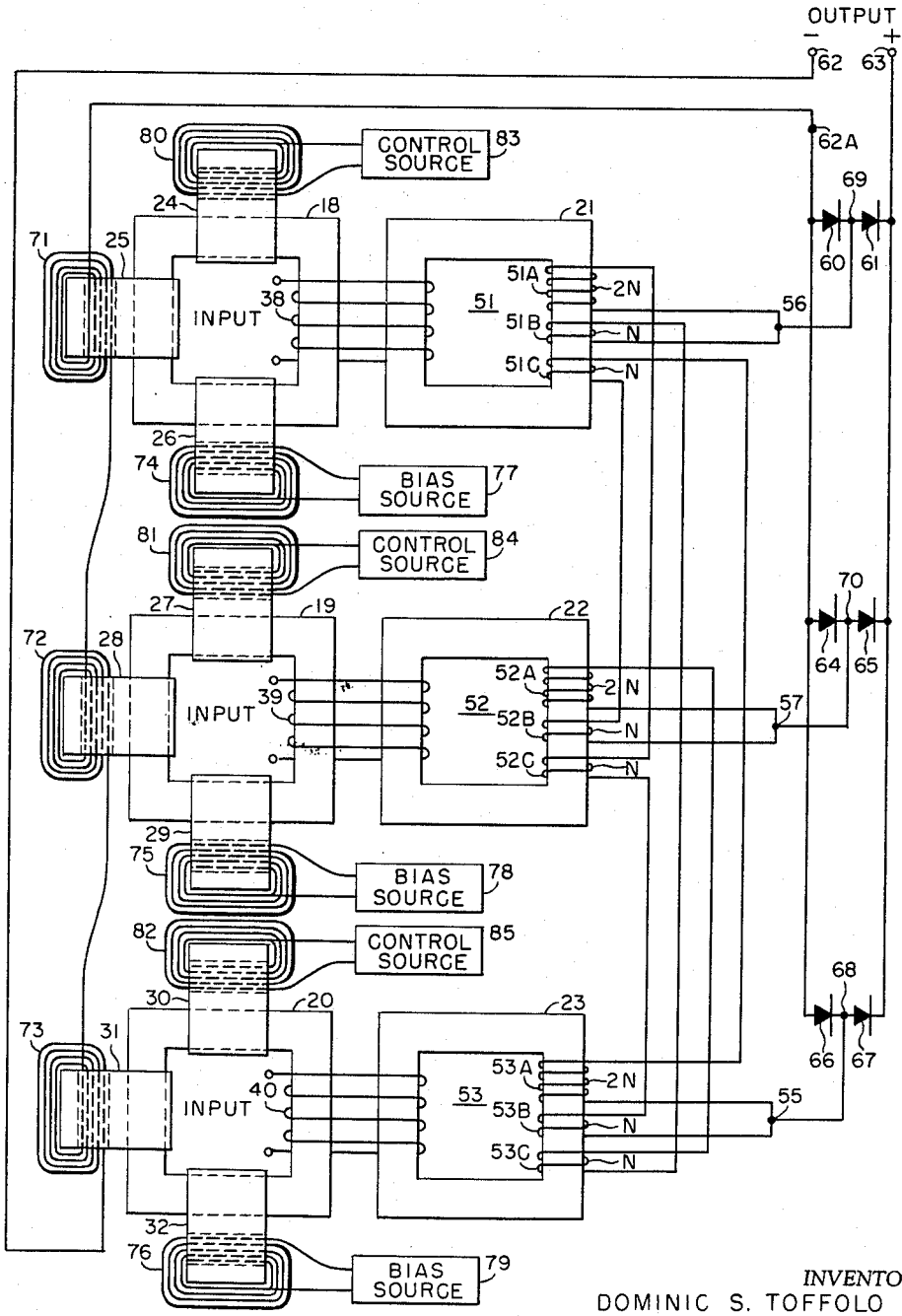

Jan. 14, 1964
D. S. TOFFOLO
3,118,104
HIGH CURRENT SIGNAL TRANSLATING CIRCUIT FOR
USE WITH THREE PHASE CONVERTER
Filed Sept. 30, 1959
5 Sheets-Sheet 3
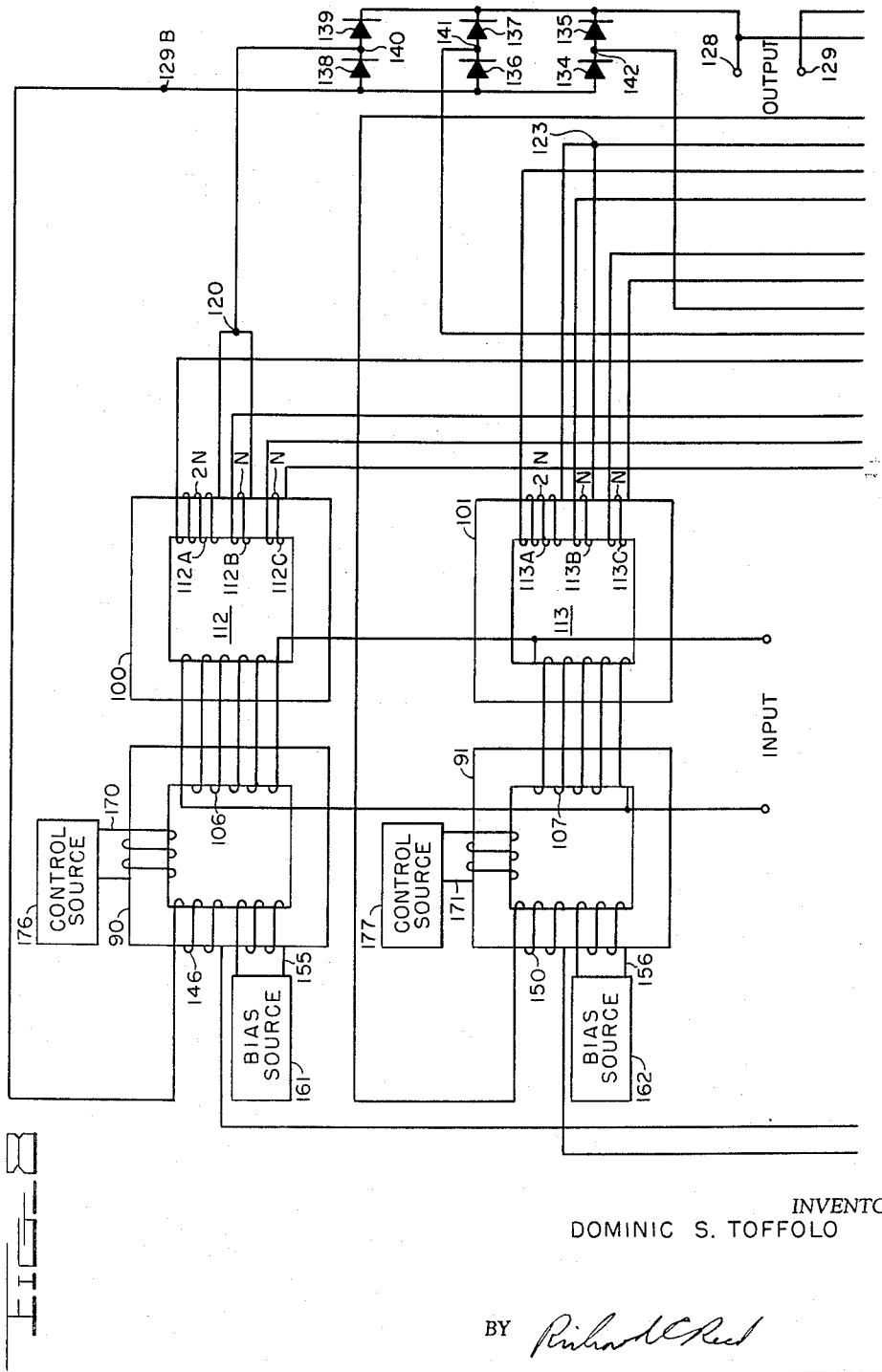
INVENTOR
DOMINIC S. TOFFOLO
BY *Richard C. Reed*
ATTORNEY

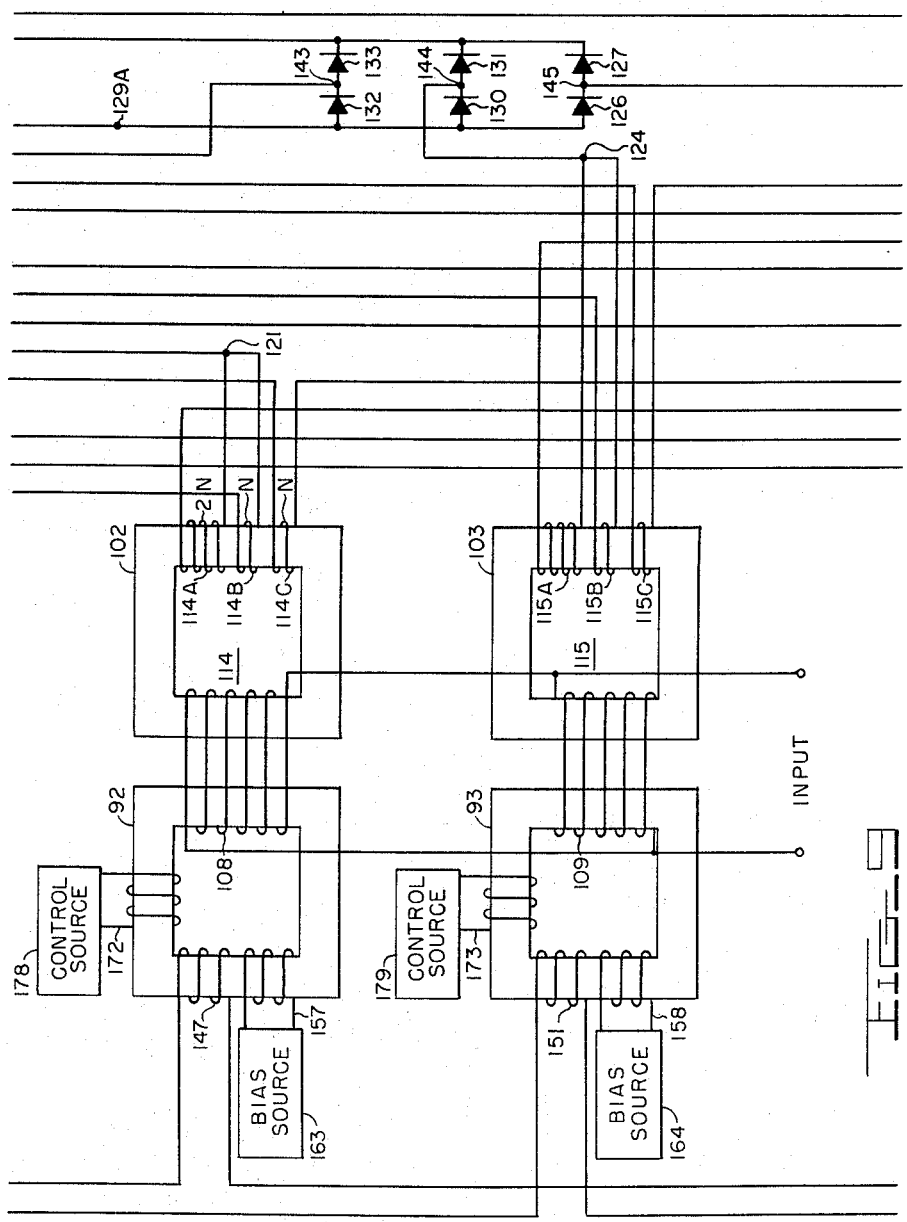

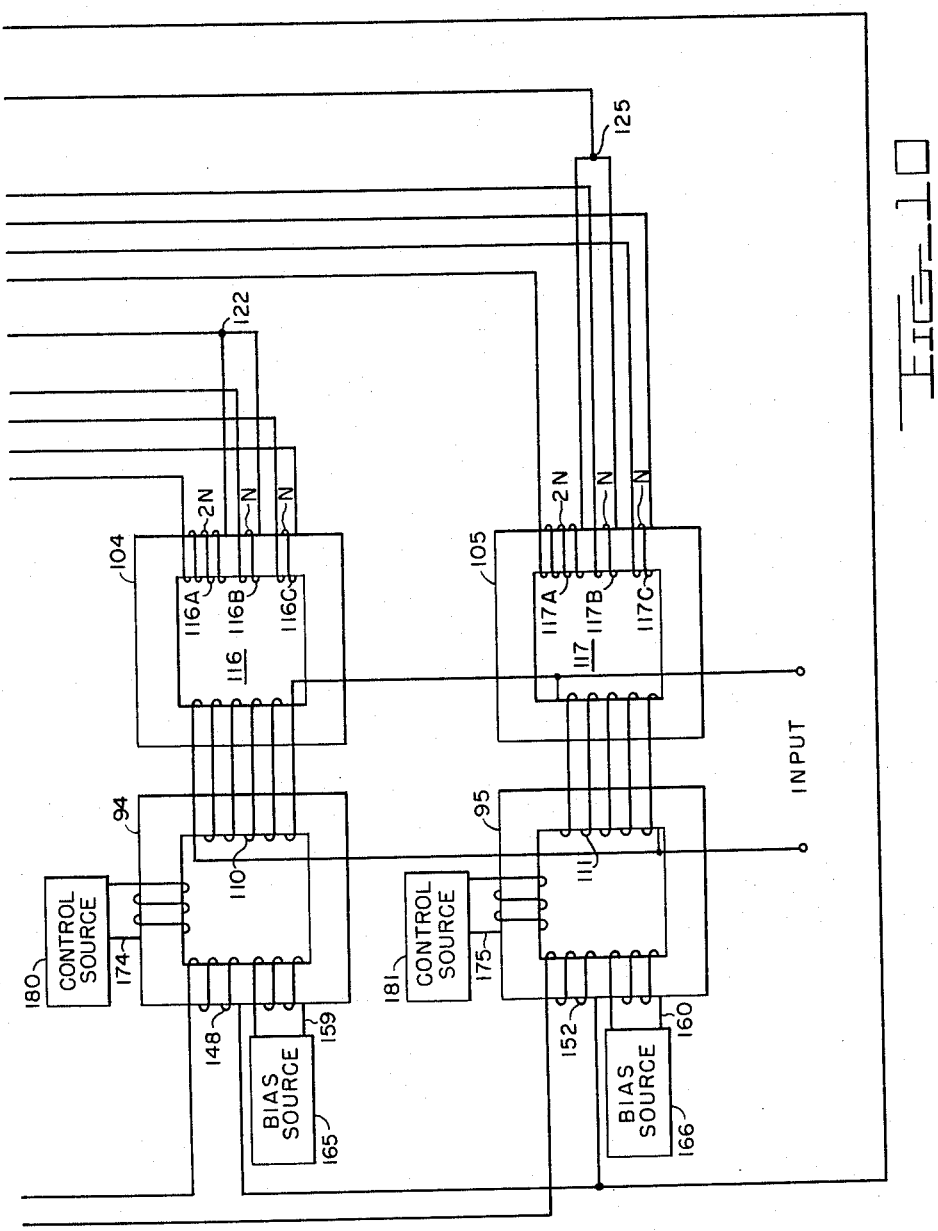

United States Patent Office 3,118,104
Patented Jan. 14, 1964

3,118,104
HIGH CURRENT SIGNAL TRANSLATING CIRCUIT FOR USE WITH THREE PHASE CONVERTER
Dominic S. Toffolo, 5483 Lorraine Drive,
Camp Springs, Md.
Filed Sept. 30, 1959, Ser. No. 848,173
12 Claims. (Cl. 321—21)
(Granted under Title 35, U.S. Code (1952), sec. 266)

The invention described herein may be manufactured and used by or for the Government of the United States of America for governmental purposes without the payment of any royalties thereon or therefor.

This invention relates to a high current signal converter and in particular to one providing a desired signal without substantially distorting the waveform of the applied signal.

In many applications, it is desired to provide a signal having a constant potential level, in spite of variations in line voltage. One arrangement for obtaining such a signal in the prior art is a transformer-rectifier circuit having a saturable reactor or magnetic amplifier connected in series with the primary to maintain the secondary potential constant by controlling the magnitude of voltage applied to the primary. The presence of the reactor or amplifier in the circuit distorts the current flowing in the primary of the transformer and the armature of the generator causing distortion of the armature reaction voltage. This in turn distorts the terminal voltage of the generator which may disturb the various electrical components connected to the output of the generator and, due to the poor waveform of the voltage presented to the regulator, in some cases, the stability of the generator itself may be affected. Further, applying a distorted waveform to the primary of the transformer increases the difficulty of filtering the output of the rectifier; and since the secondary windings are intermittent in operation when a polyphase signal is applied to the primary, harmful transients are usually generated.

Accordingly, it is an object of the present invention to provide an arrangement for converting electrical energy from one form to another without substantially distorting the waveform of the energy to be converted.

Another object is to provide a circuit which supplies a voltage that may be rectified and filtered to derive a constant potential output without substantially distorting the waveform of the applied signal.

Another object is to provide a transformer-rectifier circuit in which transients due to intermittent secondary operation do not occur.

Other objects will become apparent from the following detailed description when considered in conjunction with the drawings wherein:

FIG. 1 shows a first embodiment of the present invention.

FIG. 2 is a vector diagram of the voltage appearing across the output terminals of the embodiment shown in FIG. 1 and at selected points in the embodiment in FIG. 6 and the embodiment in FIGS. 8 to 10.

FIGS. 3 and 4 are waveforms of signals that may appear across the output terminals of the embodiment shown in FIG. 1 and at selected points in the embodiment in FIG. 6 and the embodiments in FIGS. 8 to 10.

FIG. 5 is a plot of the output current versus voltage of the embodiment shown in FIG. 6.

FIG. 6 discloses a second embodiment of the present invention.

FIG. 7 is a vector diagram of the voltage appearing across the output terminals of the embodiment shown in FIG. 6 and the embodiment in FIGS. 8 to 10.

FIGS. 8 to 10 disclose a third embodiment of the present invention.

In accordance with the teaching of the present invention, each phase of a polyphase signal is applied to a primary winding located on a separate core of a transformer. All the second windings, except one, have the same number of turns and are connected in series with a load in such a manner that the secondary having the greater number of turns is reversed in polarity with respect to the others. In this way, without distorting a signal applied to the primary windings, a single phase signal may be obtained across the load.

In another embodiment, each secondary winding is provided with three coils, one having 2N turns and two having N turns, where N is any selected number. From these coils three circuits are formed, each including an N, N and 2N coil. Each coil is located in a different winding and the 2N coil in each circuit is connected to have reversed polarity with respect to the others. When a three phase signal is applied to the primary windings, each circuit provides a single phase signal so that the three circuits may be connected to provide a three phase signal without distorting the waveform applied to the primaries.

Referring to FIG. 1, source of signals 7 provides a three phase signal, each phase of which is applied to a respective primary winding 8, 9, or 10 located on cores 11, 12 and 13. Secondary windings 14, 15 and 16 are wound in the same direction, windings 14 and 15 having N turns and winding 16 having 2N turns, as indicated in the drawing. The secondary windings are connected in series with resistor 17 in such a manner that the polarity of secondary winding 16 is reversed with respect to that of the others. It is understood, of course, that as many cores and windings as desired may be used, that the signal applied to the primary windings may have as many phases as desired, and the ratio between secondary turns may be other than N to 2N.

Referring to FIG. 2, vectors A, B, and C represent the direction and magnitude of the voltages applied across resistor 17 by secondary windings 14, 15 and 16, respectively. Vector C' represents the direction and magnitude of the voltage that would have been applied by secondary winding 16 if the polarity of the winding were not reversed. It is noted that the resultant D has the same direction as vector C with an amplitude three times that of either vectors A or B and a three phase signal, applied to the primary windings 8 to 10, develops a single phase signal across resistor 17.

Referring to FIG. 3, if each of the secondary windings 14 to 16 had the same number of turns, the primary windings would successively draw three currents having the same magnitude during the time intervals OX, XY, and YZ forming a composite square wave signal. This would disturb the armature reaction voltage of a generator supplying current to the line and would have the same disadvantages as the prior art. However, since secondary winding 16 has twice as many turns as the other secondary windings, the primary windings will draw the current having the magnitude indicated during intervals OP, PQ, QR, respectively, as shown in FIG. 4. The waveform developed approximates that of a sine wave and will not substantially affect the operation of a generator connected to the transformer and supplying the line current. It is understood, of course, that the greater number of phases employed the closer the composite wave will approach that of a sine wave.

Referring to FIG. 6, the embodiment disclosed employs a transformer having primary cores 18 to 20, secondary cores 21 to 23 and control cores 24 to 32. Each phase of a three phase signal may be applied to a respective one of the primary windings 38, 39 and 40 located on and linking cores 18 and 21, 19 and 22, and 20 and 23 respectively. The secondary windings 51, 52 and 53 each comprise a group of three coils, i.e., winding 51 includes coils 51A, 51B, and 51C; winding 52, coils 52A, 52B, 52C; and winding 53, coils 53A, 53B, and 53C. Each group has one coil having 2N turns and two coils having N turns, as indicated in the drawings, so that in secondary winding 51, coils 51B and 51C have N turns and coil 51A has 2N turns. Likewise, in secondary winding 52, coil 52A has 2N turns while coils 52B and 52C have N turns, and finally, in secondary winding 53, coil 53A has 2N and coils 53B and 53C have N turns. All the coils in secondary windings 51, 52 and 53 are wound in the same direction, and series circuits are formed by connecting an N, N and 2N coil, each from a respective secondary winding 51 to 52 and 53, in series in such a manner that the 2N coil has reversed polarity with respect to the others. For example, coils 53B, 52C, and 51A are connected between points 55 and 56, coil 51A having 2N turns and reversed polarity with respect to coils 53B and 52C. Similarly, coils 53A, 51C, and 52B are connected between points 55 and 57; and coils 52A, 53C and 51B are connected between points 56 and 57, coils 53A and 52A having 2N turns and reversed polarity with respect to their associated coils.

Unilateral impedance devices 60 and 61 are connected in series and in the same polarity across terminals 62A and 63, and unilateral impedance devices 64 and 65 as well as unilateral impedance devices 66 and 67 are connected in the same manner to the same terminals. Points 55 to 57 are connected to points 68 to 70, respectively.

Considering the various windings positioned on the control cores 24 to 32, windings 71 to 73, located on control cores 25, 28 and 31, respectively, are connected in series between terminals 62 and 62A. Each winding 74 to 76 is positioned on a respective one of control cores 26, 29, and 32 and is connected across a respective bias source 77, 78, and 79. In a similar manner, each winding 80 to 82 is positioned on a respective one of control cores 24, 27, and 30 and is connected across a respective one of control sources 83, 84, and 85. Bias sources 77 to 79 and control sources 83 to 85 are D.C. sources of potential in the preferred embodiment and in practice, for ease of control, the windings 74 to 76 may be connected in series and likewise the windings 80 to 82 may be connected in series.

The composition of primary cores 18 to 20, secondary cores 21 to 23, and control cores 24 to 32 as well as the various cores in FIGS. 1 and 8 to 10, depends to a large extent on the purpose for which the transformer is used and typically may be either solid or laminated structure. Primary cores 18 to 20, for example, may be laminated, grain oriented material. The characteristic of this material that makes the same particularly desirable in the present instance is the tremendous difference in permeability in the direction of grain orientation as compared to the permeability at right angles thereto. Thus, where permeabilities of the order of several thousand may be common in the grain oriented direction, which is that of flux produced by primary winding 38 in primary core 18, for example, transverse permeabilities of the order of several units will exist for the flux produced in the primary core by winding 71 and control core 25. Thus, even with material of high permeability for the control core, the primary core will provide a substantial reluctance to the total path for flux produced by winding 71.

It is further characteristic of grain oriented core material, that although the transverse permeability is very low compared to the oriented permeability, the percentage change in the permeability in the grain oriented direction will be substantially equal to the percentage change in the degree of saturation in the transverse direction. Thus, flux changes of several units in the transverse flux produced by winding 71 and control core 25, for example, will cause permeability changes of several thousand units in the oriented direction of primary core 18. This facilitates the control exerted by control cores 24 to 32, and their associated windings, over the flux distribution between primary cores 18 to 20 and secondary cores 21 to 23 and, consequently, the degree of coupling between primary windings 38 to 40 and secondary windings 51 to 53.

To illustrate the control exerted by transverse flux in primary cores 18 to 20, assume that substantially the same flux is produced in primary core 18 and secondary core 21 by primary winding 38 when the primary and secondary cores are identical and no additional flux is introduced in primary core. Such a condition will produce a selected degree of coupling between primary winding 38 and secondary winding 51 inducing a selected output voltage in the latter. If the flux in primary core 18 is removed or blocked, that is, the impedance of the primary core is increased by some suitable means without changing the excitation current applied to primary winding 38, the amount of flux in secondary core 21 will be increased. This effectively increases the coupling between primary winding 38 and secondary winding 51 so that an increased output voltage will result from the same excitation voltage applied to the primary winding.

The transverse flux produced in primary core 18 by windings 71, 74 and 80 controls the degree of saturation of the core in the transverse direction, which determines in part the impedance of the primary core to flux presented by primary winding 38. Thus, by changing the amount of current flowing in windings 71, 74 and 80 the impedance of primary core 18 can be controlled and, consequently, the flux distribution can be varied from a condition in which equal flux division is obtained between primary core 18 and secondary core 21 to a condition of effective saturation of the primary core when flux from primary winding 38 is concentrated in the secondary core.

It is apparent that the above relationships also exist between primary core 19 and secondary core 22 and between primary core 20 and secondary core 23 and their associated windings.

In the operation of the embodiment shown in FIG. 6, appropriate D.C. bias is applied by bias sources 77 to 79 and windings 74 to 76 to primary cores 18 and 20 providing operation about a desired point on the B-H curve. The output of control sources 83 to 85, applied to windings 80 to 82, determines in part the permeability of the primary cores by regulating the flux distribution between primary cores 18 to 20 and secondary cores 21 to 23. When each phase of a three phase signal is applied to a respective one of the primary windings 38 to 40, coils 53B, 52C and 51A, connected in series between points 55 and 56, provide a signal having the waveform shown in FIG. 4 and the vector shown in FIG. 2. Similar waveforms and vectors are provided by coils 53A, 51C, and 52B and coils 52A, 53C and 51B. Because the vectors provided are displaced by 120 degrees, the signal appearing at points 55 to 57 and applied to unilateral impedance devices 61, 65, and 67 has the vector diagram shown in FIG. 7. The unilateral impedance device, having the highest positive potential applied thereto at any one incident of time will conduct, applying a positive potential to output terminal 63 and a blocking potential on the anodes of the other unilateral impedance devices. It is apparent that each set of unilateral impedance devices 60 and 61, 64 and 65, 66 and 67 conducts during one-third of the period of operation and when conducting draws current from all three secondary windings 51 to 53 so that the unilateral impedance devices appear to be a three phase load to primary windings 38 to 40. Since each secondary winding 51 to 53 continually draws current and the total current provided by each secondary winding over a period of operation is the same, the line current remains balanced and detrimental transients, due to intermittent operation, are avoided.

When current flows in secondary windings 51 to 53, a

C.M.M.F. established in secondary cores 21 to 23 would ordinarily disturb the distribution of flux established by bias sources 77 to 79 and control sources 83 to 85. However, line current, flowing through terminals 62, 62A and windings 71 to 73, increases the impedance of the primary cores 18 to 20 and thereby increases the flux in secondary cores 21 to 23. Since the same current flows through secondary windings 51 to 53 as windings 71 to 73, the M.M.F. forcing the flux from primary cores 18 to 20 to secondary cores 21 to 23 will equal and balance out the C.M.M.F. established in the secondary cores by current flow through the secondary windings.

The action that occurs is similar to that of a compounded D.C. generator with a series field, so that depending upon the number of turns employed in windings 71 to 73, the voltage-current characteristic may be over, under or flat compounded, as shown by curves D, E, and F, respectively, in FIG. 5. The number of turns employed in the windings are selected to obtain a desired voltage-current characteristic.

In a specific example of operation, assume windings 71 to 73 are selected to provide flat compounding, and the voltage applied to the primary windings 38 to 40 is between 105 to 130 volts. If it is desired to maintain the voltage on output terminals 62 and 63 at 120 volts, control sources 83 to 85 are adjusted to provide a 40 to 60 flux distribution between primary cores 18 to 20 and secondary cores 21 to 23. If the voltage on terminals 62 and 63 is below 120 volts, the potential is brought up to the desired value by adjusting control sources 83 to 85, i.e., controlling the flux distribution between primary and secondary cores. If, on the other hand, the output voltage is above 120 volts, the potential is brought down to the desired value by adjusting bias sources 77 to 79, i.e., varying the point of operation on the B-H curve. Using this technique, a substantially uniform output voltage may be obtained over a wide variation in load on terminals 62 and 63 and/or a large variation in voltage applied to primary windings 38 to 40.

Referring to FIGS. 8 to 10, each of the primary cores 90 to 95 is coupled to a respective secondary core 100 to 105 by one of the primary windings 106 to 111. Each phase of a three phase signal may be applied to the primary windings in such a manner that the first phase is applied in parallel to primary windings 106 and 107, the second phase to primary windings 108 and 109, and the third primary windings 110 and 111. The secondary windings 112 to 117 each comprise a group of three coils all wound in the same direction, so that winding 112 includes coils 112A, 112B, and 112C; winding 113, coils 113A, 113B, and 113C; winding 114, coils 114A, 114B, and 114C; winding 115, coils 115A, 115B, and 115C; winding 116, coils 116A, 116B, and 116C; and finally winding 117, coils 117A, 117B, and 117C. Each group has one coil having 2N turns and two coils having N turns so that, for example, in secondary winding 112 coils 112B and 112C have N turns and coil 112A has 2N turns. Likewise, as shown in FIGS. 8 to 10, coils 113A, 114A, 115A, 116A, and 117A each have 2N turns while coils 113B, 113C, 114B, 114C, 115B, 115C, 116B, 116C, 117B, and 117C each have N turns.

An N, N and 2N coil, each from a respective secondary winding, are connected in series in such a manner that the 2N coil has reverse polarity with respect to the others. For example, coils 112A, 114C, and 116B are connected in series between points 120 and 122, coil 112A reversed in polarity with respect to coils 114C and 116B. Similarly, the remaining coils, as shown in FIGS. 8 to 10, are connected in series in groups of three, each group connected between two of points 120 to 125. Each of the latter points is connected to a respective one of points 140 to 145.

Unilateral impedance devices 126 and 127, connected in series in the same polarity, are positioned across terminals 128 and 129A. Likewise, unilateral impedance devices 130 and 131, connected in series in the same polarity, and unilateral impedance devices 132 and 133, connected the same way, form two pair of devices placed across terminals 128 and 129A. In a similar manner, unilateral impedance devices 134 to 139 are divided into pairs and connected across terminals 128 and 129B.

Considering the various control windings positioned on primary cores 90 to 95, windings 146 to 148, located on primary cores 90, 92 and 94, respectively, form a series circuit between terminals 129 and 129B, and windings 150 to 152, located on primary cores 91, 93, and 95 are connected in series between terminals 129 and 129A. Each biasing winding 155 to 160 is positioned on a respective one of the primary cores 90 to 95 and is connected across a respective bias source 161 to 166. Each control winding 170 to 175, located on a respective one of the primary cores, is similarly connected across a respective one of the control sources 176 to 181. Bias sources 161 to 166 and control sources 176 to 181 are D.C. sources of potential in the preferred embodiment and in practice, for ease of control, the bias sources may be connected in series and likewise the control sources may be connected in series.

It is noted that the embodiment in FIGS. 8 to 10 is symmetrical in the sense that it comprises two substantially identical units for each phase of a three phase system, one including, for example, primary core 90, secondary core 100, their associated windings, and unilateral impedance devices 138 and 139. The other including primary core 91, secondary core 101, associated windings, and unilateral impedance devices 132 and 133. One unit operates during the positive and the other during the negative portion of a respective phase in a three phase system, and each functions in a manner similar to the embodiment in FIG. 6.

In the operation of the embodiment shown in FIGS. 8 to 10, current flowing in windings 170, 171 and 155, 156 produces flux in primary cores 90 and 91. When a positive signal is applied in parallel to primary windings 106 and 107, the flux established thereby in primary core 90 will aid that caused by winding 155 and the flux established thereby in primary core 91 will oppose that established by winding 156. When a negative signal is applied to the same primary windings, these relationships are reversed so that the flux set up by winding 155 will be opposed and that set up by winding 156 will be aided by the flux attributed to the negative signal. Because similar relationships exist between the flux established in primary cores 92 and 93, primary cores 94 and 95 and their associated windings, appropriate bias applied to the primary cores by bias sources 161 to 166 and windings 155 to 160 may, as in the embodiment shown in FIG. 6, provide operation about a desired point on the B-H curve; and the output of each control source 176 to 181 may effect a desired flux distribution between one of the primary cores 90 to 95 and a respective one of the secondary cores 100 to 105.

When a three phase signal is applied to primary windings 106 to 111, coils 112A, 114C, and 116B, connected in series between points 120 and 122, provide a signal having a waveform similar to the positive portion of the one shown in FIG. 4; and coils 113A, 115C, and 117B, connected in series between points 123 and 125, provide a waveform similar to the negative portion of the one shown in FIG. 4. Hence, the two groups of coils, operating in push-pull relationship produce a waveform substantially as shown in FIG. 4 having the vector shown in FIG. 2. Similar waveforms and vectors are produced by the other coils associated with secondary cores 100 to 105 and connected in series in groups of three between points 120 and 125. Since the vectors provided are displaced by 120 degrees, the signal appearing at points 120 to 125 and applied to points 140 to 145 has the vector diagram shown in FIG. 7.

The one of the unilateral impedance devices 126 to 133 and the one of unilateral impedance devices 134 to 139 having the greatest positive potential applied thereto during an incident of time will conduct, feeding a positive potential to terminal 128 and a blocking potential on the anodes of the other impedance devices in its group. Consequently, each set of unilateral impedance devices 126, 127, and 130, 131, and 132, conducts during one-sixth of the period of operation and when conducting draws current from secondary windings 113, 115 and 117, and each set of unilateral impedance devices 134, 135, and 136, 137, and 138, 139 likewise conducts during one sixth of the period of operation drawing current from secondary windings 112, 114 and 116.

When current flows in secondary windings 112 to 117, a C.M.M.F. established in secondary cores 100 to 105 would ordinarily disturb the flux established by control sources 176 to 181 and/or bias sources 161 to 166. However, during the positive portions of a three phase signal applied to the primary windings 106 to 111, the line current flowing through terminal 129B and windings 146 to 148 increases the impedance of primary cores 90, 92 and 94, thereby increasing the flux in secondary cores 100, 102, and 104 while during the negative portions of the signal current flowing through windings 150 to 152 increases the flux in secondary cores 101, 103 and 105 for the same reason. Since the current flowing through secondary windings 112 to 117 also flows through windings 146 to 152 the M.M.F. forcing flux from the primary to secondary cores will tend to balance out the C.M.M.F. forcing flux from the secondary to primary cores.

The action that occurs, as in the embodiment shown in FIG. 6, is similar to that of a compounded D.C. generator with a series field, so that depending on the number of turns employed in windings 146 to 152, the voltage-current characteristic may be over, under or flat compounded, as shown by curves D, E, and F, respectively in FIG. 5. The number of turns employed in the windings is selected to give the desired voltage-current characteristic.

Since the specific operation of the embodiment shown in FIGS. 8 to 10 is essentially the same as the one in FIG. 6, for a particular operation of the former, reference is had to one given above for the latter.

It should be understood, of course, that the foregoing disclosure relates to only preferred embodiments of the invention and that it is intended to cover all changes and modifications of the examples of the invention herein chosen for the purpose of disclosure, which do not constitute departures from the spirit and scope of the invention.

What is claimed is:

1. In a signal translating circuit for use with three phase A.C. systems, at least one plurality of three transformer sections, each of said transformer sections comprising first and second cores, each of said transformer sections including an input winding wound about both cores therein and adapted to produce a magnetic field having a selected reference direction in each of said first and second cores in response to current flow in a selected direction through said input winding, means for connecting said input windings to a three phase A.C. system such that each input winding is energized by maximum current flow in said selected direction in successive order, at least one magnetic field biasing means associated with each of said transformer sections and adapted for biasing said first core therein, at least one rectifier means including three similarly polarized unidirectional means connected in parallel, each of said unidirectional means comprising a pair of serially connected unidirectional elements, a pair of output terminals and means for connecting said rectifier means across said pair of output terminals, a plurality of three synthetic secondary windings each having three portions in $2n, n, n$ inductive relation, where $n$ is a constant, each of said synthetic secondary windings having a different one of said portions thereof on each of said second cores of said three transformer sections with the $2n$ portion of each synthetic secondary winding on a different one of said second cores, each of said portions of said synthetic secondary windings being wound on its respective second core to produce a magnetic field of opposite direction with respect to said selected reference direction to the magnetic field produced by its respective input winding, means connecting said synthetic secondary windings in a delta arrangement having three terminal connections, and means connecting said delta arrangement of synthetic secondary windings to said rectifier means such that each of said three terminal connections is connected to a respective unidirectional means at the common connection of said unidirectional elements.

2. The circuitry as described in claim 1 wherein said magnetic field biasing means comprises at least a first winding on each of said first cores, said first windings are electrically connected in series, and said means for connecting said rectifier means across said output terminal includes said first windings in series connection.

3. The circuitry as described in claim 2 wherein said magnetic field biasing means also comprises at least one additional winding on said first core in each transformer section with D.C. voltage supply means connected thereacross.

4. The circuitry as described in claim 2 wherein said magnetic field biasing means also comprises two additional windings on said first core in each transformer section with variable D.C. voltage supply means connected across each of said additional windings to provide adjustable magnetic fields in said first core.

5. The circuitry as described in claim 1 wherein first and second pluralities of said transformer sections are associated with first and second pluralities of said rectifier means respectively, said first and second pluralities of rectifier means are connected in parallel across said output terminals such that said first and second pluralities of rectifier means are similarly polarized and said input windings of respective transformer sections in said first and second plurality thereof are energized during opposite portions of their respective phases.

6. The circuitry as described in claim 2 wherein first and second pluralities of said transformer sections are associated with first and second pluralities of said rectifier means respectively, said first and second pluralities of rectifier means are connected in parallel across said output terminals such that said first and second pluralities of rectifier means are similarly polarized, and said input windings of respective transformer sections in said first and second plurality thereof are energized during opposite portions of their respective phases.

7. The circuitry as described in claim 4 wherein first and second pluralities of said transformer sections are associated with first and second pluralities of said rectifier means respectively, said first and second pluralities of rectifier means are connected in parallel across said output terminals such that said first and second pluralities of rectifier means are similarly polarized, and said input windings of respective transformer sections in said first and second plurality thereof are energized during opposite portions of their respective phases.

8. In a signal translating circuit for use with three phase A.C. systems, at least one plurality of three transformer sections, each of said transformer sections comprising at least one core, each of said transformer sections including an input winding wound about said core therein and adapted to produce a magnetic field having a selected reference direction in said core in response to current flow in a selected direction through said input winding, means for connecting said input windings to a three phase A.C. system such that each input winding is energized by maximum current flow in said selected direction in successive order, at least one magnetic field biasing means associated with each of said transformer sections and adapted to keep the average flux level in said core substantially constant, at least one rectifier means including three similarly polarized unidirectional means connected in parallel, each of said unidirectional means comprising a pair of serially connected unidirectional elements, a pair of output terminals and means for connecting said rectifier means across said pair of output terminals, a plurality of three synthetic secondary windings each having three portions in $2n, n, n$ inductive relation, where $n$ is a constant, each of said synthetic secondary windings having a different one of said portions thereof on each of said cores of said three transformer sections with the $2n$ portion of each synthetic secondary winding on a different one of said cores, each of said portions of said synthetic secondary windings being wound on its respective core to produce a magnetic field of opposite direction with respect to said selected reference direction of the magnetic field produced by its respective input winding, means connecting said synthetic secondary windings in a delta arrangement having three terminal connections, and means connecting said delta arrangement of synthetic secondary windings to said rectifier means such that each of said three terminal connections is connected to a respective unidirectional means at the common connection of said unidirectional elements.

9. The circuitry as described in claim 8 wherein said magnetic field biasing means comprises at least a first winding on each of said cores, said first windings are electrically connected in series, and said means for connecting said rectifier means across said output terminal includes said first windings in series connection.

10. The circuitry as described in claim 9 wherein said magnetic field biasing means also comprises at least one additional winding on said core in each transformer section with D.C. voltage supply means connected thereacross.

11. The circuitry as described in claim 9 wherein said magnetic field biasing means also comprises two additional windings on said core in each transformer section with variable D.C. voltage supply means connected across each of said additional windings to provide adjustable magnetic fields in said core.

12. The circuitry as described in claim 8 wherein first and second pluralities of said transformer sections are associated with first and second pluralities of said rectifier means respectively, said first and second pluralities of rectifier means are connected in parallel across said output terminals such that said first and second pluralities of rectifier means are similarly polarized, and said input windings of respective transformer sections in said first and second plurality thereof are energized during opposite portions of their respective phases.

References Cited in the file of this patent

UNITED STATES PATENTS

| | | |
|---|---|---|
| 764,213 | Steinmetz | July 5, 1904 |
| 2,628,340 | Potter | Feb. 10, 1953 |
| 2,790,130 | Nyyssonen | Apr. 23, 1957 |
| 2,860,299 | Pomazal | Nov. 11, 1958 |
| 2,892,142 | Genuit | June 23, 1959 |
| 2,894,195 | Genuit | July 7, 1959 |